United States Patent [19]

Lee

[11] Patent Number: 5,075,812

[45] Date of Patent: Dec. 24, 1991

[54] DIGITAL AUDIO TAPE CASSETTE

[76] Inventor: Jeen-Ju Lee, 4th Floor, No. 1, Alley 2, Syh-Wei Lane, Chung-Chen Road, Hsin-Tien City, Taipei Hsien, Taiwan

[21] Appl. No.: 520,776

[22] Filed: May 8, 1990

[51] Int. Cl.⁵ .............................................. G11B 23/087
[52] U.S. Cl. ............................................................ 360/132
[58] Field of Search ........................ 360/132; 242/199

[56] References Cited

U.S. PATENT DOCUMENTS

| 4,926,279 | 5/1990 | Kurashina et al. | 360/132 |
| 4,678,138 | 7/1987 | Nemoto | 360/132 |
| 4,683,510 | 7/1987 | Meguro | 360/132 |
| 4,733,316 | 3/1988 | Oishi et al. | 360/132 |
| 4,905,113 | 2/1990 | Shiba et al. | 360/132 |
| 4,947,276 | 8/1990 | Meguro | 360/132 |
| 4,969,611 | 11/1990 | Katagiri et al. | 360/132 |

*Primary Examiner*—Robert S. Tupper
*Attorney, Agent, or Firm*—Kirschstein, Ottinger, Israel & Schiffmiller

[57] ABSTRACT

A digital audio tape cassette includes post and wedge portions for locking a slider more safely; location guiders for guiding two refraction prisms at designated positions in an upper shell; two pairs of hooks for hooking each other to avoid separation when opening a lid; two springs integrally formed at either side of the brake for easier assmbly; four couplers engaging each other to avoid cutting a magnetic tape; and a fastener assembly for fastening the brake in a nonoperational position before assembly and for defastening the brake from the upper shell in an operational position.

2 Claims, 11 Drawing Sheets

DIGITAL AUDIO TAPE CASSETTE

FIELD OF THE INVENTION

This invention relates to a digital audio tape cassette for recording digital signals, such as PCM signals.

BACKGROUND OF THE INVENTION

It is known to employ a digital audio tape cassette in a device able to record and reproduce recorded PCM signals, a kind of digital signal, converted from analog signals including audio signals. In a conventional PCM signal record-reproduce device, a turning magnetic head is used to obtain higher recording density, and its magnetic tape is pulled out from the cassette, when it is performing recording or reproducing, and is wound on a turning magnetic drum set with the turning magnetic head.

However, a defect lies in contaminating the magnetic tape which may be stained by dust or oil adhered to one's fingers in the handling process, and thus drop-out signals exist. For this reason, it would be better to envelope the magnetic tape in a case so as to protect it from contamination.

A conventional tape cassette in the prior art is typically composed of a cassette housing assembled by an upper shell and a lower shell, a slider able to move on the outer part of the lower shell, a lid able to turn at the front end of the cassette housing, two spools able to turn in the cassette housing, each of which has a ratchet, a magnetic tape having its two ends separately fixed at each rim of the two spools, a brake having two brake portions separately engaged with the ratchets of the two spools so as to prevent the magnetic tape from unwinding, a spring set between the slider and the lower shell so as to keep the slider moving only towards the lid, a metal spring set between the brake and the upper shell so as to have the brake portions separately engaged with the ratchets of the two spools, and two refraction prisms fixedly mounted in the upper shell and formed into one element to detect movement of the magnetic tape by means of refraction.

In order to have the PCM signal record-reproduce device easily controlled by the slider, or to have the slider smoothly slide on and change its position, a lock tenon at the free end of a slider lock has two oblique surfaces. Moreover, when the slider is started, it has a tendency to slide towards closing under the force of elasticity of the spring. Thus, if the cassette housing is placed in the PCM signal record-reproduce device, the slider and the lid will be opened sequentially by the device, and performance of recording and reproducing also starts. Under such circumstances, if the cassette housing incurs impacts, the slider under the force of elasticity of the spring will unexpectedly slide over the oblique surfaces and thereby close the device accidentally. The lid will be held open by the accidentally closed slider and cannot close. In normal operation, the slider cannot close until the lid closes. This will lead to a result that the cassette housing is stuck in the PCM signal record-reproduce device and is unable to be taken out, and worse, both the magnetic tape and the device will be damaged.

Furthermore, since the free end of the slider lock has two oblique surfaces, the push the slider needs when sliding over one oblique surface is equal to the push the slider needs when sliding over the other oblique surface. This is one of the major reasons for the slider being easily closed accidentally.

If a transparent window is mounted at the upper shell, and two refraction prisms are connected at the window, there will be difficulty in mounting the prisms at a proper position in the upper shell. Thus, inaccurate refraction will result in wrong operation.

When a tape clip presses the end of the magnetic tape into a concave recess of a respective spool, the snugly coupling tape clip in the concave recess can easily break the magnetic tape, and also the tape clip can drop off axially. However, if the tape clip doesn't couple the concave recess snugly enough, the end of the magnetic tape is not tightly fixed.

When the lid opens, though its arms push and press brake drivers of the brake, the lid arms can easily drop from the brake drivers, and vice versa.

The spring is a single part, which has some trouble in assembly, particularly with the brake.

When being assembled, the brake, under elasticity of the spring, has its brake portions stretch uncontrolledly, which obstructs the assembly of the two spools.

SUMMARY OF THE INVENTION

In order to remove the aforesaid defects, this newly-developed cassette housing has two slider locks. In the free end of each of these slider locks is mounted a post to be molded with the slider lock into one element. Each post extends upwardly towards the upper shell and stops with a little distance away from the upper shell. In addition, the brake has a wedge portion. When the lid is lifted to drive the brake to move forwardly towards two guide cylinders, the wedge portion of the brake is inserted into the space between the upper shell and each post. Each post is pushed towards the lower shell so as to make a lock tenon more fixedly hook into a lock hole of the slider to prevent the slider from closing accidentally.

When the slider lock is located perpendicularly to a line along which the slider moves, equal push is required by the slider to slide over the two oblique surfaces of the slider.

At the bottom of each refraction prism is set a first location guider, and in the inner part of the upper shell is mounted a second location guider coupling with the first location guider. By coupling the first location guider with the second location guider, each refraction prism can be more accurately positioned.

In the concave recess of the spool is mounted a concave (or convex) tape clip having coupling elements.

At each arm of the lid is mounted a first hook, and at each brake driver of the brake is mounted a second hook. When the lid is lifted, each first hook then connects with the associated second hook at the brake driver of the brake.

From the brake extends one or two springs, each of which is formed with the brake as one element.

At the upper shell is set a first fastening portion, and at the brake is set a second fastening portion. This second fastening portion, before the upper and the lower shells are assembled, fastens with the first fastening portion, which keeps the brake portions away from each spool so as to leave space for the spools to be mounted. At the lower shell is set a defastening portion so that when the upper and the lower shells are assembled, this defastening portion releases the second fastening portion at the brake from the first fastening portion.

DETAILED DESCRIPTION OF THE PREFERRED EMBODIMENTS

Referring to FIGS. 1 to 7 in the drawings, 1 is the cassette housing, composed of an upper shell 2 and a lower shell 3 to be combined into one element by screws. 2a is the transparent window to be mounted at the upper shell. 4 is a pair of turning spools contained in the cassette housing 1 and positioned on a pair of driven holes 5 formed at assigned places in the lower shell 3. A magnetic tape 6 is wound on the spools 4.

7 is a pair of guide cylinders opposite to the front side and near the side wall of the cassette. The magnetic tape 6 is guided over the cylinders 7. 3b is a plate on the lower shell 3 facing the back side of the magnetic tape 6 wound on the guide cylinders 7, along the assigned width of which an oblong concave opening 3a is cut in which a guide wire used to pull out the magnetic tape from the record-reproduce device is inserted.

Meanwhile, at the front part of the cassette housing 1 is mounted a lid 8 to cover the exposed part of the magnetic tape; at either end of the lid is mounted an arm 8a with an axle to support the lid 8 so that the lid 8 can turn on it freely. When the cassette housing is not in use, the lid 8 can protect the magnetic tape 6 in the cassette housing from contamination.

At the lower portion of the lower shell 3 of the cassette housing 1 is mounted a slider 9 able to move back and forth. When the slider 9 is moving backwardly and the concave portion 3a is open, the reel at the bottom of the slider 9 is inserted into the driven hole 5 and the opening 10. Meanwhile, at either side of the front end of the bottom of the slider 9, when the slider 9 moves backwardly, a pair of slider locks 11 at either side of the bottom of the lower shell 3 are elastically mounted in the lock holes 12a and 12b and are fixed with a proper distance between them.

Also, at the center of the front part of the bottom of the slider 9 is mounted a protruding pin 13 extending through a spring 14; the end of this pin 13 is locked in the front plate 3b of the lower shell 3. Thus, the bias pressure of the spring 14 constantly pushes the slider 9 forwardly.

As for the slider 9, there are two conditions to be found. One is that when the cassette housing is not in use, the slider 9 is positioned at the front end and covers the concave portion 3a of the cassette housing 1 and each reel driven hole 5, because each slider lock 11 is held in a respective rear lock hole 12a and thus the slider 9 is kept in position. The other is that when the cassette is being placed in the magnetic record-reproduce device, the device releases each slider lock 11 from the respective rear lock hole 12a, and the slider 9 slides rearwardly against the bias pressure of the spring 14. Thus, the concave portion 3a of the cassette housing 1 and the reel driven hole 5 are uncovered, and each slider lock 11 is held in a respective front lock hole 12b which keeps the slider 9 released.

At the back of the upper shell 2 is mounted a pair of stop pins 15 opposite to the slider locks 11 at both ends of the lower shell 3. The front ends of the stop pins 15 are set at the back parts of the front ends of the slider locks 11 and are fixed separately at a proper distance. If the slider lock 11 bends inwardly too much, it will abut the stop pin 15 and prevent the slider lock 11 from too much damage and wear.

In addition, at the inner part of the upper shell 2 and the lower shell 3 of the cassette housing 1, a reel brake 16 is mounted so as to prevent the magnetic tape 6 from unwinding when unexpectedly driven by the tape reel 4 which turns unexpectedly after incurring shocks.

This brake 16, which is formed along the back of the upper shell 2 in the shape of the letter "C", is composed of a brake plate 16a and two brake arms 16b perpendicular to the brake plate 16a. At the rear edge of the brake plate 16a and opposite to the ratchets 4a on the two spools 4 are set a pair of brake portions or posts 16c. Each brake arm 16b extends forwardly until the end part forms a brake driver 16d. Also, in the center of the brake plate 16a at the upper part of the brake 16 is set a spring 17 having its tail end in the shape of the letter "V" which is held in the back of the front wall of the upper shell 2.

As for the brake 16, when the cassette housing is not in use, or the lid 8 is closed, it slides backwards to the rear part by means of elasticity of the spring 17, with each post 16c engaging a respective ratchet 4a of the spool 4 so as to lock the spool 4. If the lid 8 is lifted and turned, the brake drivers 16d will be pressed by the arms 8a of the lid 8 so that the brake 16 resists the bias pressure of the spring 17 and starts to slide forwardly; meanwhile, the posts 16c leave the ratchets 4a of the spools 4 so as to permit the spools 4 to turn.

However, when using this cassette housing with this brake 16 of the prior art, people are used to mounting the brake 16 after winding the magnetic tape 6 on the spool 4 at the lower shell 3. The defects exist in the spring which adversely affect accurate assembling of the brake 16, and the probable danger of dropping the brake 16 when the components including magnetic tapes 6 and the lower shells 3 of the brake 16 are assembled.

From the two ends of the transparent window 2a are separately mounted two refraction prisms 18a and 18b. In the PCM record-reproduce device are separately mounted light detectors and light sources which separately project light to the refraction prisms. If the magnetic tape of one of the two spools 4 reaches its end to expose a transparent tape section, then the light projected from the light source will be refracted from the refraction prisms 18a or 18b to the associated light detector in the PCM signal record-reproduce device, so as to stop the running magnetic tape 6. Such refraction prisms 18a, 18b mounted in the cassette housing 1 are difficult to accurately position.

Figure 1:
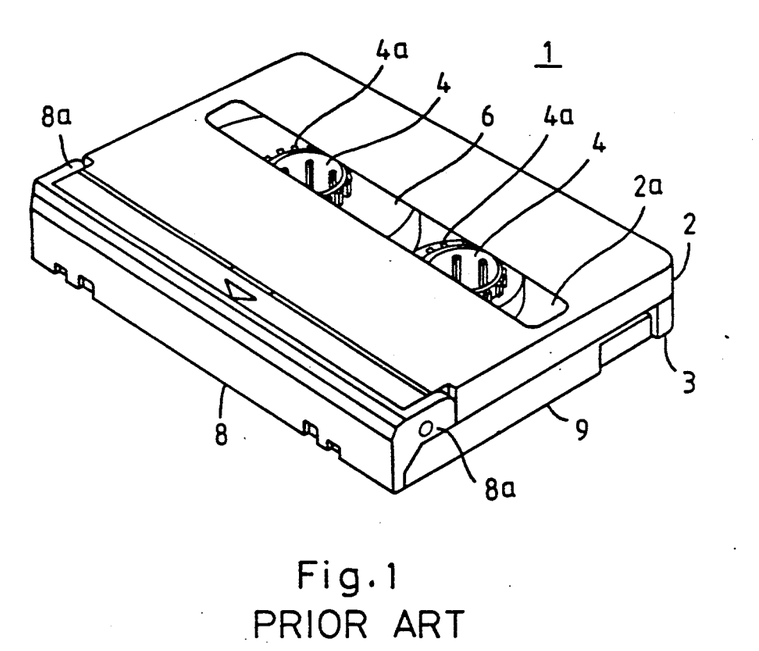
FIG. 1 is a perspective view of a typical digital audio tape cassette according to the prior art.
Figure 2:
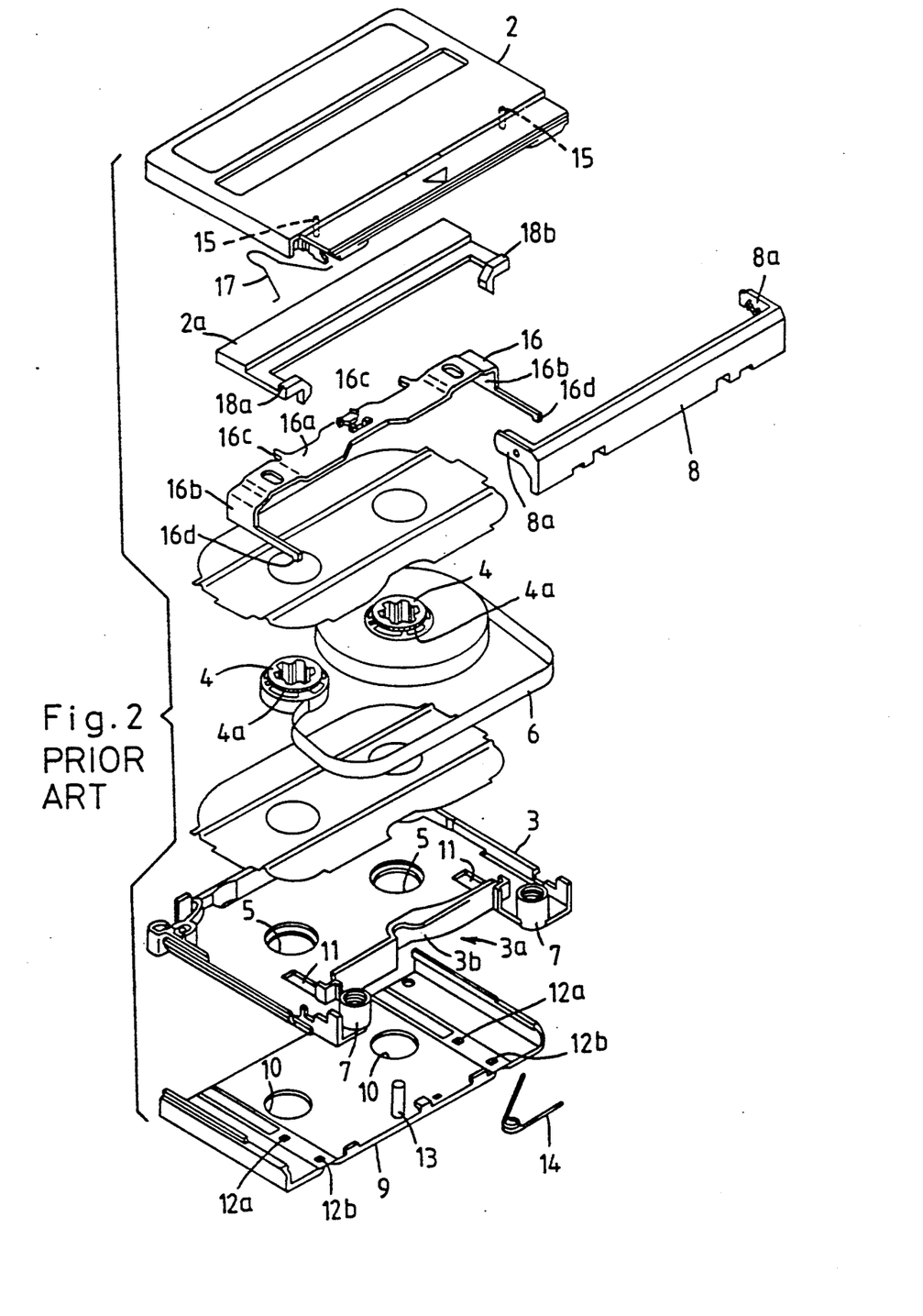
FIG. 2 is an exploded perspective view of the cassette of FIG. 1.
Figure 3:
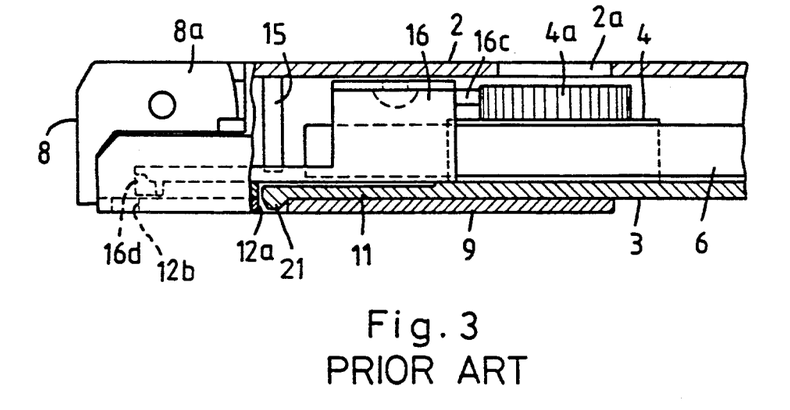
FIG. 3 is a broken-away, part-sectional, side view of the cassette of FIG. 1 in its normal condition.
Figure 4:
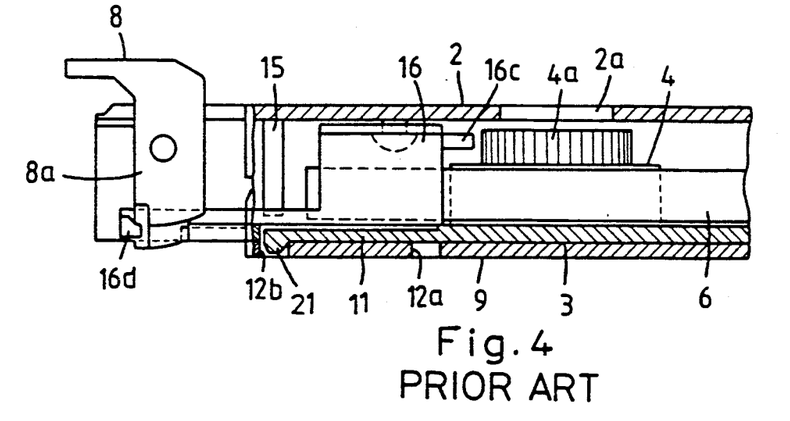
FIG. 4 is a view analogous to FIG. 3, showing the cassette in use.
Figure 5:
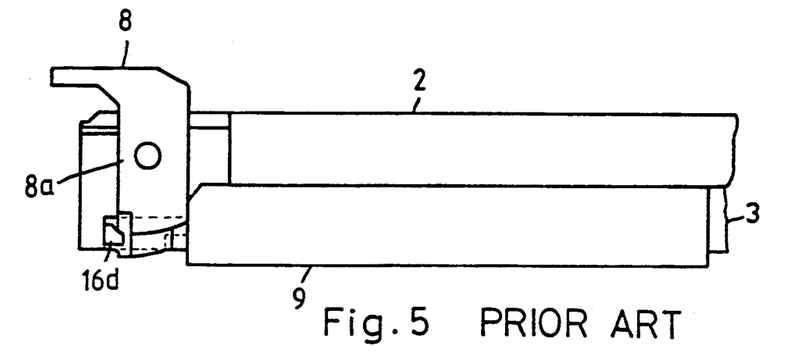
FIG. 5 is a side view of the cassette of FIG. 1, showing the slider closing unexpectedly.
Figure 6:
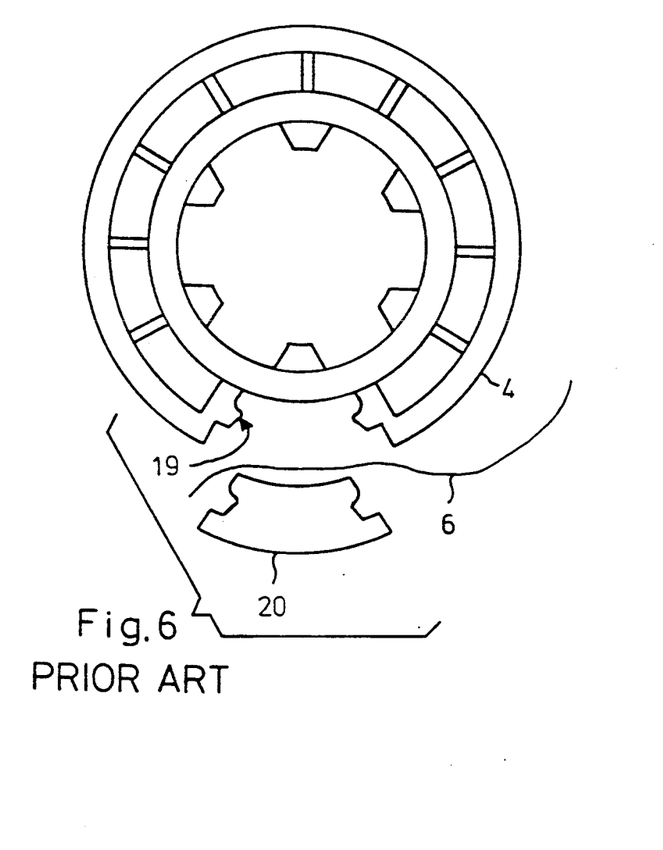
FIG. 6 is an exploded plan view, showing the spool of the cassette of the prior art.
Figure 7:
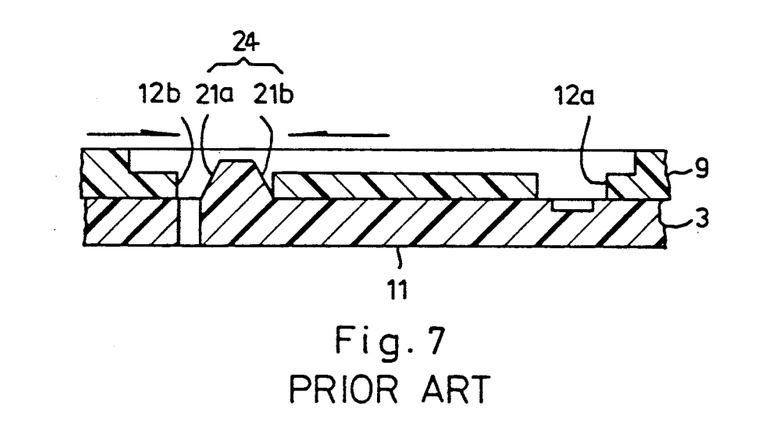
FIG. 7 is an enlarged sectional view of the lower shell and the slider of the cassette of the prior art.

As shown in FIG. 6, the spool 4 has a concave recess 19 in which the end of the magnetic tape is placed. Then, a tape clip 20 is pressed into the recess 19 to fix the end of the magnetic tape 6 at the outer rim of the spool 4.

Figure 8:
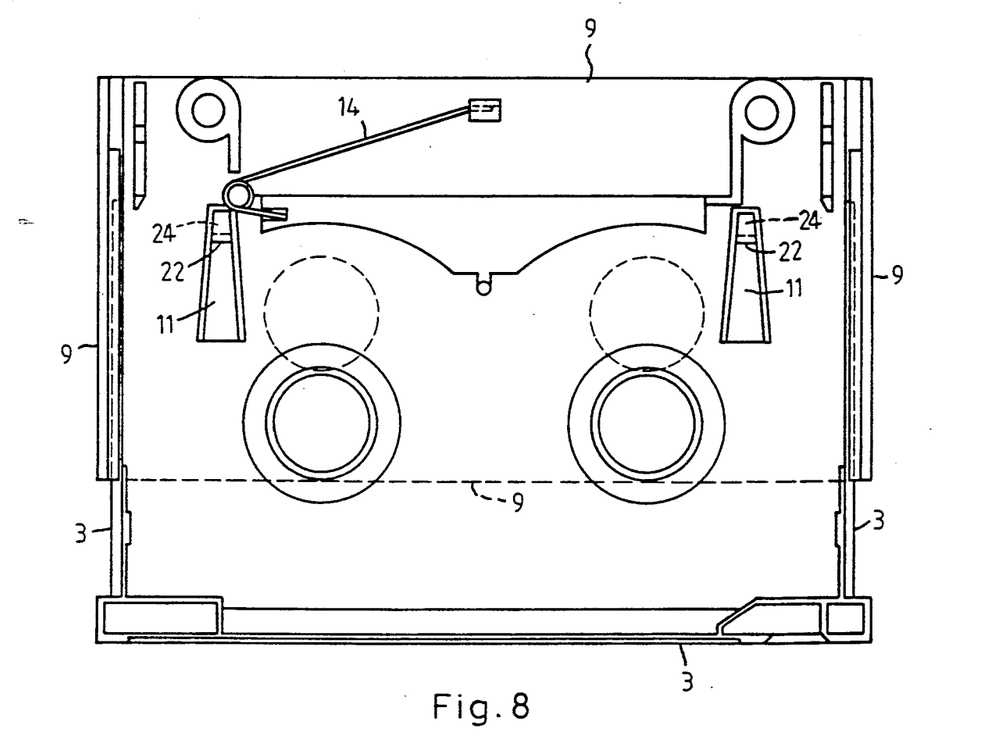
FIG. 8 is an interior, top plan view of the lower shell of the cassette, of the present invention, with the upper shell removed for clarity.
Figure 9:
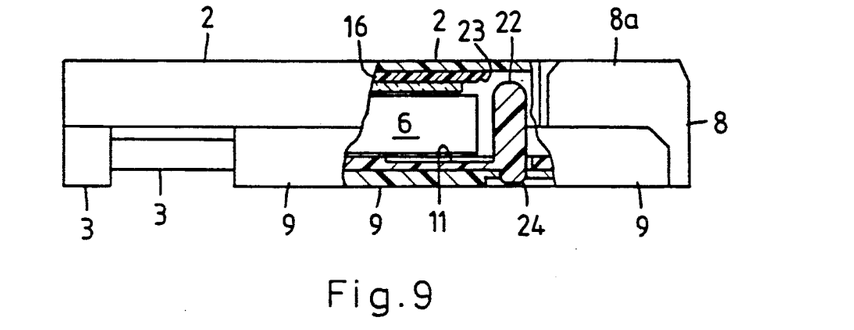
FIG. 9 is a broken-away, part-sectional, side view of the cassette of the present invention in its normal state.
Figure 10:
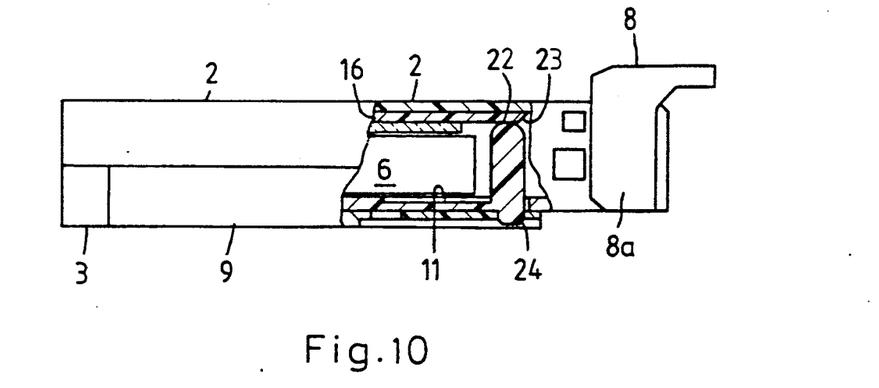
FIG. 10 is a view analogous to FIG. 9 of the cassette in use.

In the invention of FIGS. 8 to 10, two posts 22 and 22 are separately mounted inside the two slider locks 11 and 11, especially the ends of the slider locks, also behind the lock tenons 24 and 24. These two posts 22 and 22 are not necessarily set at the place right behind the lock tenons 24 and 24, but can be a little away from the lock tenons 24 and 24, and not stop the magnetic tape. These two posts 22 and 22 are individually formed with the slider locks 11 and 11 into one element.

As shown in FIG. 10, when the lid 8 is lifted and turned at an angle of 95°, the brake 16 is pulled forwardly by the lid 8 and thus the wedge portions 23 and 23 of the brake 16 are inserted into the middle part of the post 22 and the upper shell 2, respectively and stop the two slider locks 11 and 11 bending inwardly. In this way, the lock tenons 24 and 24 of the slider locks 11 and 11 are fixedly secured in the two lock holes 12a and 12b of the slider 9, thereby fixing the slider 9 at the starting position, and preventing displacement. Before closing the lid 8, turn it back to the original place first, and the brake 16 back to normal so as to permit the two slider locks 11 and 11 to act freely; thus the slider 9 is driven back to the closing position.

In order to successfully insert the wedge portions 23 and 23 of the brake 16 into the middle part of the posts 22 and 22 and the upper shell 2, the posts 22 and 22 have round heads (or bevel heads) and the wedge portion 23 of the brake 16 has its head bevelled and slanted.

Figure 11:
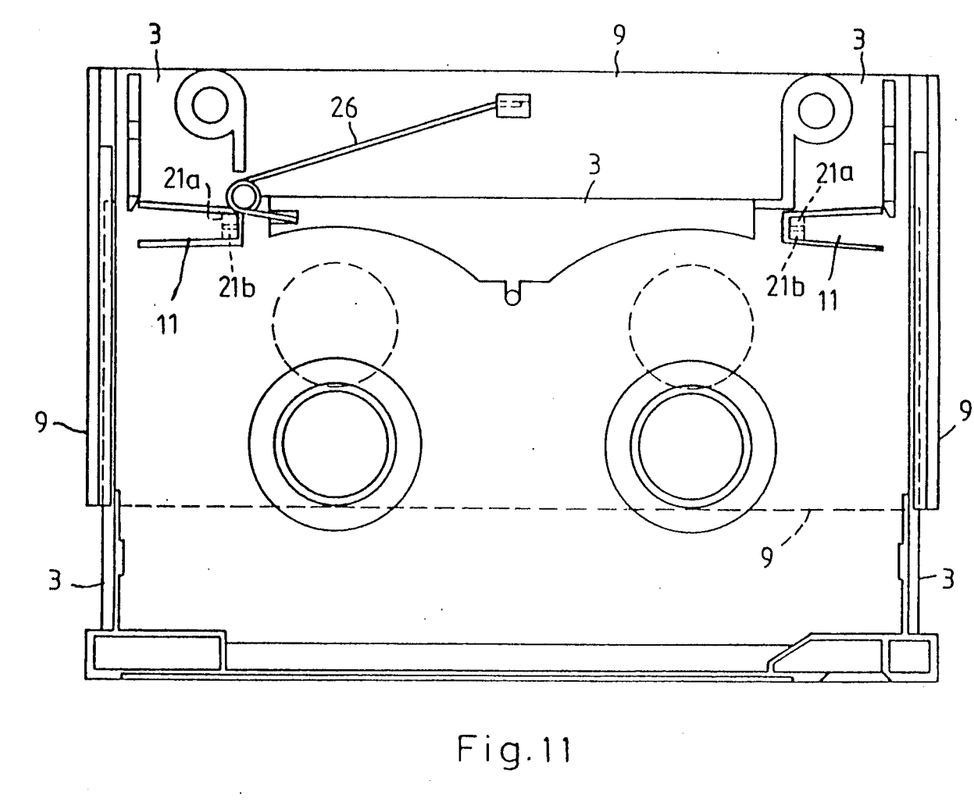
FIG. 11 is an interior, top plan view of the lower shell of the cassette of the present invention, showing another embodiment of the slider lock, with the upper shell removed for clarity.

As shown in FIG. 11, the slider locks 11 and 11 are set horizontally so as to ensure a right angle with the movement line of the slider 9. As a result, equal movement from every oblique surface 21a or 21b to the center is obtained. In other words, equal push is required in sliding over any oblique surface 21a or 21b.

Figure 12:
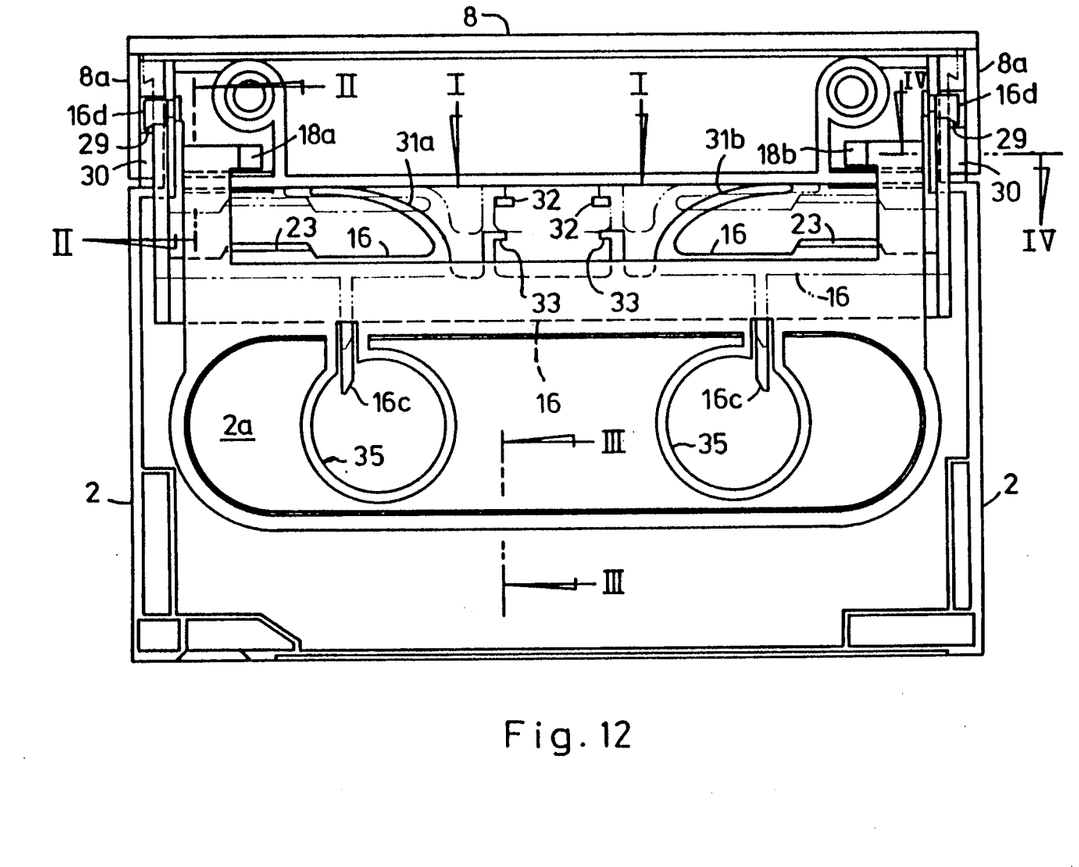
FIG. 12 is an interior, bottom plan view of the upper shell of the cassette of the present invention, with the lower shell removed for clarity.
Figure 14:
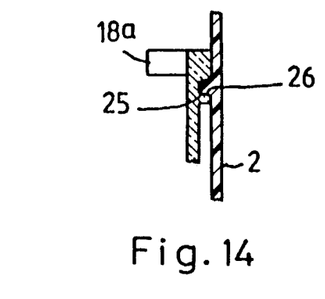
FIG. 14 is a cross sectional view taken along line II—II of FIG. 12.
Figure 15:
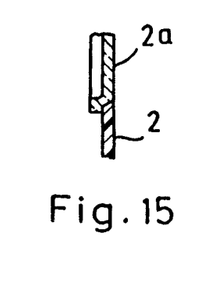
FIG. 15 is a cross sectional view taken along line III—III of FIG. 12.

As shown in FIGS. 12 and 14, at the upper shell 2 is designed a location guider 25; and also at the edge of the window 2a or the refraction prisms 18a and 18b are designed location guiders 26, 26. These location guiders can precisely and accurately position the refraction prisms 18a and 18b.

Figures 17, 18:
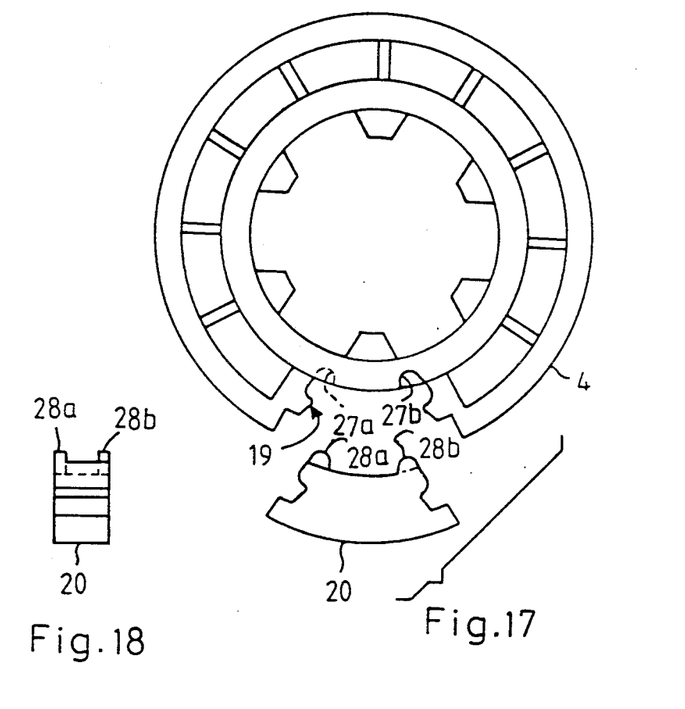
FIG. 17 is an exploded plan view of a spool of the cassette of the present invention.
FIG. 18 is a left side view of a tape clip of the spool as shown in FIG. 17.
Figure 19:
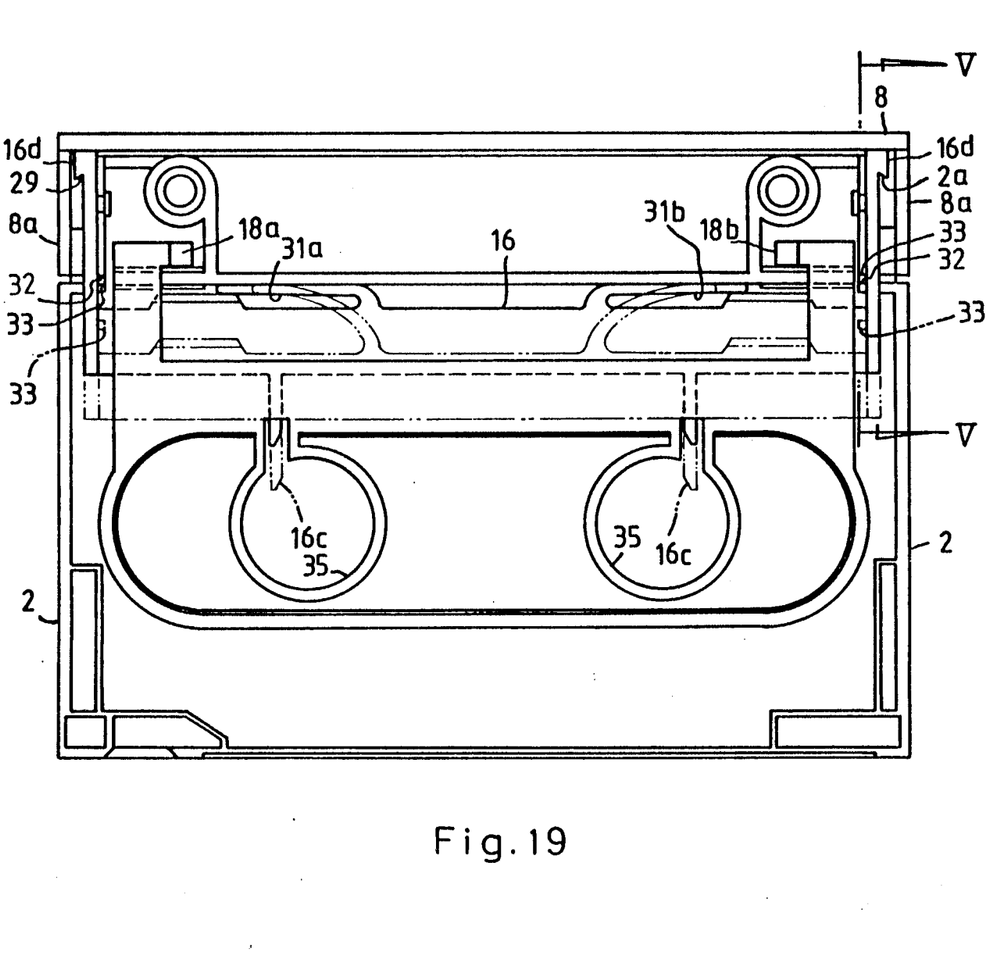
FIG. 19 is an interior, top plan view of the upper shell of the cassette of the present invention, showing another embodiment of the fastening means.
Figure 20:
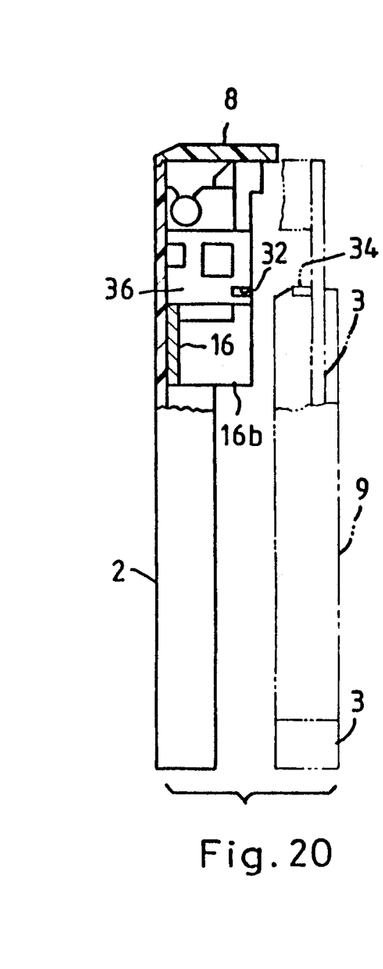
FIG. 20 is a cross sectional view taken along line V—V of FIG. 19.

As shown in FIGS. 17 and 18, in the concave recess 19 of the spool 4 are mounted two wells 27a and 27b separately located at the sides of the concave recess 19. Opposite to the ends of the tape clip 20 are also set two projections 28a and 28b. When the wells and projections are coupled to each other, the tape clip 20 is fixedly secured and has no danger of dropping off axially. For this reason, between the tape clip 20 and the concave recess 19, a larger clearance can be left so that there will be no worry of cutting off the magnetic tape and also the magnetic tape can be tightly held by means of coupling of elements 27a, 28a, and 27b, 28b. The elements 27a, 27b; 28a, 28b can be also set in the middle of the clip.

Figure 16:
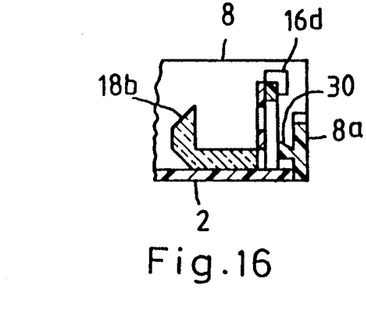
FIG. 16 is a cross sectional view taken along line IV—IV of FIG. 12.

As shown in FIGS. 12 and 16, both the brake driver 16d at either end of the brake 16 and the arms 8a of the lid 8 are formed into hooks 29, 30. In this way, hooks 29, 30 can be fixedly hooked to each other and have no danger of loosening.

As shown in FIG. 12, forwardly from the brake 16 are extruding two springs 31a and 31b. These springs 31a and 31b are formed with the brake 16 in one operation. The moving ends of the springs 31a and 31b can be against the wall 2b of the upper shell 2. The major advantage of this design is to ensure easier assembly.

Figure 13:
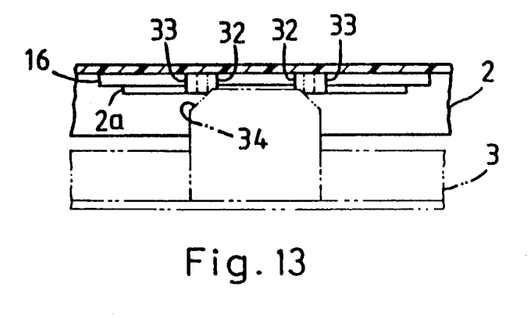
FIG. 13 is a cross sectional view taken along line I—I of FIG. 12.

In FIGS. 12 and 13, a first fastening portion 32 is mounted at the upper shell 2, and a second fastening portion 33 is mounted at the brake 16. When the brake is pulled to the top end and reaches the right place touching the lid 8 (Note: Under the control of a switch, the brake cannot reach so high a place as this), the second fastening portion 33 extends in the first fastening portion 32 rightaway, and thus the brake 16 is held and the posts 16c drop from the spools 4 accordingly. Under such condition, there are no obstacles for the spools to be placed in. When the lower shell 3 couples with the upper shell 2, a defastening portion 34 of the lower shell 3, by means of the closing action, pushes the second fastening portion 33 away from the first fastening portion 32, and the brake 16 stops operation of the spools 4 by means of the recoil force of the springs 31a, 31b. The lid 8 doesn't have enough strength under normal operation, to pull the brake 16 so as to extend the second fastening portion 33 into the first fastening portion 32. Therefore, the defastening portion 34 should be used under the operation of the first fastening portion 32 and the second fastening portion 33 so as to release the brake 16 from the bearing 35 before the upper shell 2 couples with the lower shell 3, and also ensure accurate assembly of the two spools 4, 4.

In FIG. 9, another embodiment of the invention is given. On the walls 36, 36 of two sides of the upper shell 2 are formed two first fastening portions 32 and 32. As a matter of fact, the two first fastening portions 32, 32 are concavely formed, while the two second fastening portions 33, 33, which are used as convex tenons, are formed at the two brake arms 16b of the brake 16. The defastening portion 34 is mounted at either side of the lower shell 3, and is formed into a tenon. If the brake 16 is assembled with the upper shell 2, the second fastening portions 33, 33 will separately fasten and engage with the two first fastening portions 32, 32 at the upper shell 2, thereby releasing the post 16c of the brake 16 from the bearing 35 without creating any obstacles in assembling the two spools 4, 4. When the upper and the lower shells 2, 3 are being assembled, the two defastening portions 34, 34 at the lower shell 3 automatically align with the two second fastening portions 33, 33 and separately place pressure over them until these two second fastening portions 33, 33 separate from the two first fastening portions 32, 32. The fastened upper shell 2 and the brake 16 is therefore released, and the operation of the brake 16 goes back to normal.

When the cassette housing is placed in the PCM signal record-reproduce device, the slider is first opened and is set at the starting position, and then the lid is lifted. When the lid is lifted and opened, the brake is pulled by the lid and moves towards the lid. At this time, the two wedge portions in the brake are respectively inserted into the middle part of the two posts of the slider locks so as to push the lock tenons into, and to fixedly hook, the lock holes of the slider. Thus, the slider is prevented from unexpectedly sliding or closing.

When the slider locks are set perpendicularly to the line on which the slider moves, equal push is required for the slider to slide over any lock tenons, and thus unexpected closing is minimized.

The refraction prisms can be automatically and accurately positioned by means of correspondence of the position of the first location guider at the bottom of the refraction prism and the second location guider at the upper shell of the cassette housing.

By means of using the second tape clip, the tape clip can easily and fixedly clip the end of the magnetic tape between coupling elements. This is why the tape clip should not be too snugly close with the concave recess. Therefore, by using this device, neither will the tape clip fall from the tape clip concave recess, nor will the tape clip be broken by pressure.

When the lid is lifted, the first hook at the arm hooks the second hook of the brake driver at the brake so as to ensure stronger fastening of the lid and the brake driver.

Formed with the brake in one operation, the spring extruding from the brake ensures easier and more convenient assembly.

By means of coupling the first fastening portion of the upper shell with the second fastening portion of the brake, the post of the brake is released from the bearing. In this way, the two spools can be more easily mounted without any obstacle caused by the post of the brake. Also, when the upper shell couples with the lower shell, smooth movement of the lid can be ensured and trouble in assembly can be solved by means of the force released by the defastening portion of the lower shell to press the second fastening portion to separate from the first fastening portion.

I claim:

1. A tape cassette, comprising:
   (a) a housing having an upper shell and a lower shell;
   (b) a pair of rotary spools mounted between the shells, each spool having a recess and a pair of wells;
   (c) a magnetic tape wound on the spools and having opposite ends, each received in a respective recess;
   (d) a lid mounted on the housing for pivoting movement between a closed and an open position;
   (e) a slider mounted on the housing for sliding movement between a forward position closer to the lid, and a back position further from the lid, said slider having a first set and a second set of locking holes;
   (f) a pair of slider locks at opposite lateral sides of the lower shell, said locks having tenons received in said first set of locking holes in the forward position, and in said second set of locking holes in the backward position, said locks also having posts extending away from the lower shell toward the upper shell but terminating at a spacing therefrom, said post and tenon of each lock being integrally formed and extending in opposite directions relative to each other;
   (g) a brake for engaging the spools to prevent unwinding of the tape in the closed position of the lid, said brake having wedge portions and being operatively connected to, and driven by, the lid during said pivoting movement to the open position to move the wedge portions into said spacing and to affirmatively urge the posts toward the lower shell and the tenons into the first set of locking holes, thereby resisting unauthorized movement of the slider, said brake having a pair of first hooks, and said lid having arms that include a pair of second hooks, said second hooks hookingly engaging the first hooks, said brake having integral springs, said upper shell having first fastening means, and said brake having second fastening means, said first and second fastening means engaging each other prior to mounting the shelf together, said lower shell having means for unfastening said first and second fastening means to separate the brake and the upper shell after mounting the shells together;
   (h) a pair of refraction prisms, each prism having a first guide locator thereon, said upper shell having a pair of second guide locators integral therewith, each second guide locator respectively engaging a first guide locator to accurately position each prism; and
   (i) a clip mounted in each recess, each clip having a pair or projections for reception in a respective well.

2. The tape cassette of claim 1, wherein the slider is mounted for linear sliding movement along a predetermined direction, and wherein each lock extends along a direction normal to said predetermined direction.

* * * * *